US012694298B1

(12) United States Patent
Irfan et al.

(10) Patent No.: US 12,694,298 B1
(45) Date of Patent: Jul. 28, 2026

(54) VERIFICATION OF NEURAL NETWORK MODEL EVOLUTION

(71) Applicant: Amazon Technologies, Inc., Seattle, WA (US)

(72) Inventors: Ahmed Irfan, Cupertino, CA (US); Homer Strong, Seattle, WA (US); Soon Ho Kong, Cupertino, CA (US); Atiye Alaeddini, Kirkland, WA (US); Aleksandar Nevenov Chakarov, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1038 days.

(21) Appl. No.: 17/850,761

(22) Filed: Jun. 27, 2022

(51) Int. Cl.
| | |
|---|---|
| *G06N 3/048* | (2023.01) |
| *G06N 3/044* | (2023.01) |
| *G06N 3/086* | (2023.01) |

(52) U.S. Cl.
CPC ..................................... *G06N 3/086* (2013.01)

(58) Field of Classification Search
CPC ............. G06N 3/086; G06N 5/04; G06N 5/05
See application file for complete search history.

(56) References Cited

U.S. PATENT DOCUMENTS

| | | | | |
|---|---|---|---|---|
| 2020/0097835 A1* | 3/2020 | Silver | .................... | G16B 10/00 |
| 2020/0134422 A1* | 4/2020 | Gliozzo | ................... | G06N 3/09 |

| | | | | |
|---|---|---|---|---|
| 2021/0329306 A1* | 10/2021 | Liu | ........................... | G06N 5/04 |
| 2021/0406664 A1* | 12/2021 | Timofejevs | .............. | G06N 5/04 |
| 2024/0114162 A1* | 4/2024 | Maharana | .............. | H04N 19/21 |

OTHER PUBLICATIONS

Shen et al.; "Towards Backward-Compatible Representation Learning"; IEEE/CVF Conf on Computer Vision and Pattern Recognition; 2020; p. 6368-6377.
Katz et al.; "Reluplex: An Efficient SMT Solver for Verifying Deep Neural Networks"; CAV Part I; 2017; p. 97-117.
Huang et al.; "A survey of safety and trustworthiness of deep neural networks: Verification, testing, adversarial attack and defence, and interpretability"; Computer Science Review; vol. 37; May 2020; 95 pages.
Liu et al. "Algorithms for Verifying Deep Neural Networks"; Foundations and Trends in Optimization; vol. 4; 2021; 22 pages.

(Continued)

*Primary Examiner* — Brandon S Cole
(74) *Attorney, Agent, or Firm* — BakerHostetler

(57) ABSTRACT

A plurality of result pairs may be compared of at least part of an input region of neural network model input data. Each of the plurality of result pairs may include a first result provided by a first neural network model for a respective subregion of the input region and a second result provided by a second neural network model for the respective subregion. The second neural network model may be an update of the first neural network model. It may be determined that there exists a non-equivalent result pair within the plurality of result pairs, wherein the first result of the non-equivalent result pair provided by the first neural network model differs from the second result of the non-equivalent result pair provided by the second neural network model. The second neural network model may be retrained based at least in part on existence of the non-equivalent result pair.

20 Claims, 10 Drawing Sheets

(56) References Cited

OTHER PUBLICATIONS

Yan et al.; "Positive-Congruent Training: Towards Regression-Free Model Updates"; IEEE/CVF Conf. on Computer Vision and Pattern Recognition; 2021; p. 14299-14308.

Stefano Soatto; "Graceful AI"; Amazon Science; https://www.amazon.science/latest-news/graceful-ai; May 2021; accessed Oct. 4, 2021; 12 pages.

Eleftheriadis et al.; "On Neural Network Equivalence Checking using SMT Solvers"; arXiv:2203.11629; Mar. 2022; 16 pages.

"2nd International Verification of Neural Networks Competition (VNN-COMP'21)," webpage <https://sites.google.com/view/vnn2021> saved on Apr. 11, 2021 by Internet Archive Wayback Machine, retrieved from Internet Archive Wayback Machine <https://web.archive.org/web/20210411042114/https://sites.google.com/view/vnn2021> on Mar. 20, 2024; 2 pages.

\* cited by examiner

15

VERIFICATION OF NEURAL NETWORK MODEL EVOLUTION

BACKGROUND

Neural network models are a class of machine learning models and are used in many application domains. Like software, neural network models need to be periodically updated because of the availability of the new data or the need to refine the model architecture. However, unlike traditional software, there has been less attention on the issues of neural network model evolution. While a new neural network model may generally improve average performance as compared to an old model, the new model may also potentially introduce errors that were not present in the old model. In some examples, releasing a new, improved model to a customer can change the behavior of an underlying application because the new model may change the neural network weights and in turn change the prediction, especially for inputs the customer values as important. For example, customers may become confused and frustrated when recommendations that are based on neural network model predictions become inconsistent. In some cases, even a single inconsistency may begin to erode a customer's trust in neural network model-based recommendations.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
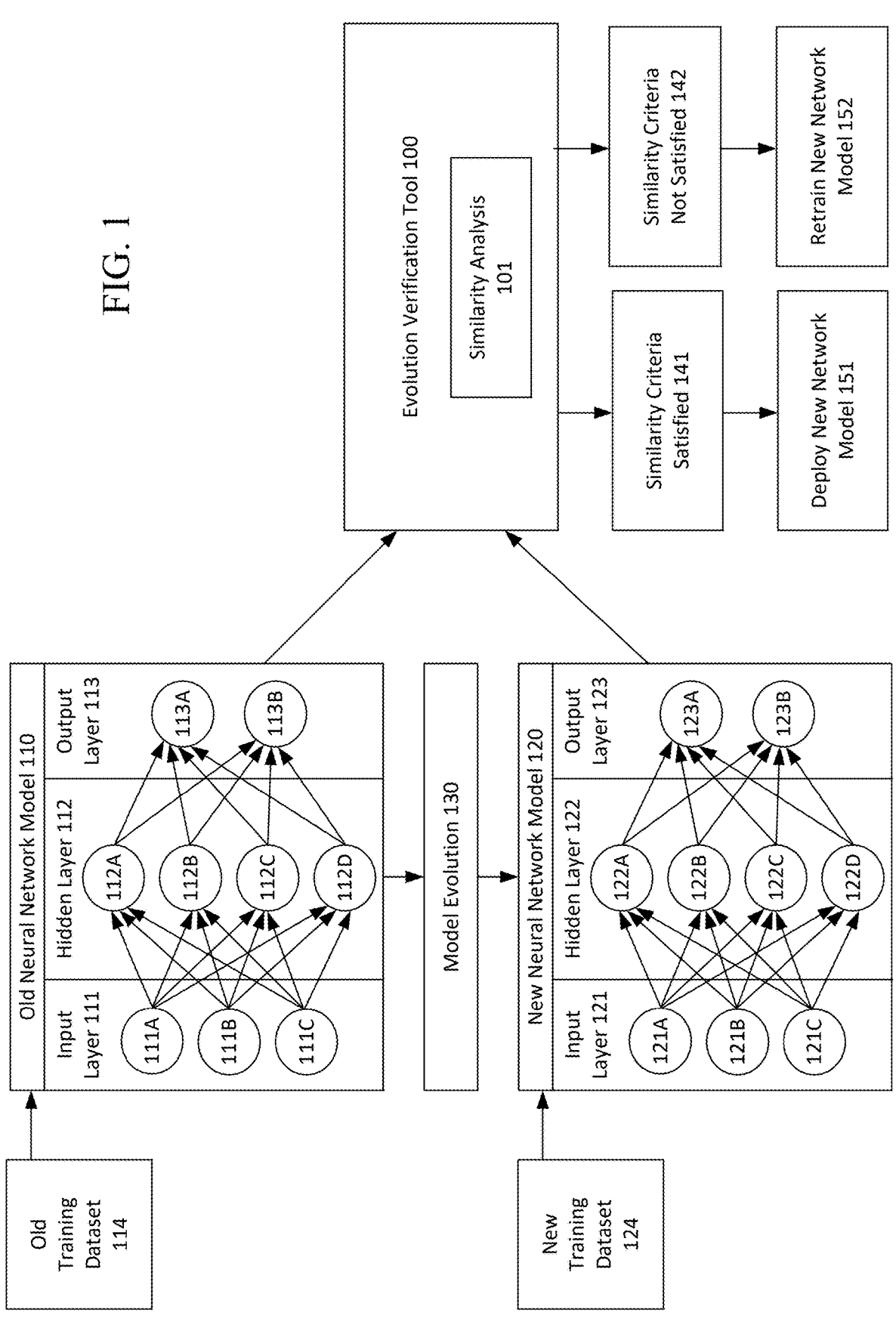
FIG. 1 is a diagram illustrating an example neural network model evolution testing system that may be used in accordance with the present description.

Techniques for verification of neural network model evolution are described herein. The techniques described herein may be used in connection with a new neural network model and an old neural network. The new neural network model may be an update of the old neural network model. The old and new neural network models may be employed to perform the same, or similar types, of analyses, such as to solve the same problem. However, there may be differences between the old and new neural network models. For example, the new neural network model may be trained subsequent to the training of the old neural network model. Additionally, the new neural network model may be trained using a new training dataset that is at least partially different from an old training dataset used to train the old neural network model. For example, the new neural network model may be trained to account for the availability of new information and/or to refine a model architecture.

In some examples, a tool may be provided that may be used to test and analyze the new neural network model in comparison to the old neural network model. Specifically, the tool may be employed to test the new neural network model after training (or after one or more iterations of training) of the new neural network model but prior to release and deployment of the new neural network model.

In particular, the tool may search through at least part of an input region to attempt to find scenarios in which the old model and the new model provide different results for corresponding inputs. The input region may be a region of inputs for which the new neural network model and the old neural network model are expected to provide the same results. To perform the search of the input region, the tool may compare results provided by the old neural network model and the new neural network model. Specifically, the input region may include a plurality of subregions. Each subregion may have a respective result pair. Each result pair may include a first result provided by the old neural network model for the respective subregion and a second result provided by the new neural network model for the same respective subregion. For each subregion, the tool may compare the first result to the second result within the result pair for the subregion. The tool may search the input region to attempt to find a subregion of the input region that has a non-equivalent result pair, which is a result pair in which the first result provided by a first neural network model (e.g., the old neural network model) is different from the second result provided by a second neural network model (e.g., the new neural network model). In some examples, if the tool is unable to find any non-equivalent result pairs within the input region, then this indicates that there are no unintended changes in results provided by the new neural network model as compared to the old neural network model. This indicates that the new neural network model is ready to deploy.

By contrast, in some examples, if the tool detects a non-equivalent result pair within the input region, then this may indicate that further processing is required. For example, in some cases, upon detecting a non-equivalent result pair, the validity of the input values for the respective subregion may be examined to check their validity. Specifically, in some cases, input values may be valid when the input values correspond to an existing customer usage pattern. By contrast, in some examples, the input values may be invalid when the input values do not correspond to any existing customer usage pattern. The reason for this is that input values that do not correspond to any existing customer usage pattern may be considered irrelevant, and it would not be practical to delay deployment of the new neural network model because of changes that do not actually impact any customers. For scenarios in which the input values are invalid, the input region may be refined so as to exclude the invalid input values, and the search may be re-executed with the refined input region.

For scenarios in which the non-equivalent result pair is based on valid input values, it may be determined that the new neural network model is resulting in relevant unintended changes and is, therefore, not yet ready to deploy. In these scenarios, the new neural network model may be retrained in order to correct the relevant unintended changes. In some examples, in order to increase the likelihood that the relevant unintended changes will be corrected, synthetic training data may be added into the training data set that is used for the retraining of the new neural network model. The synthetic training data may include data representative of the input values for the detected non-equivalent result pair and indications of desired and/or non-desired results for those input values. In some examples, the process of comparing result pairs, detecting a non-equivalent result pair, and retraining the new neural network model may be repeated until the tool is able to confirm that there are no non-equivalent result pairs within the input region. Once it is confirmed that there are no non-equivalent result pairs, the new neural network model may be deployed.

It is noted that, in some examples, the input region that is searched by the tool may include only inputs for which the old neural network model and the new neural network model are expected to provide the same results. Put another way, the input region that is searched by the tool may not include inputs for which the old neural network model and the new neural network model are expected to provide different results, such as scenarios in which a false positive provided by the old neural network model is flipped to a true negative provided by the new neural network model. Thus, it is noted that there is no requirement that the new neural network model and the old neural network model must provide identical results for every possible set of inputs that could potentially be provided to those models. Rather, in some examples, the tool may instead be used to confirm that the two neural network models provide the same results for scenarios in which they are expected to provide the same results.

In one specific example, the tool described above may be used to test neural network models that make predictions regarding customer usage of identity and access management permissions. Specifically, customers may assign permissions to various principals, such as to manage resource access capabilities and other operations that may be performed by those principals. Security permissions may ideally be assigned using a least-privilege strategy, in which principals are only granted permissions that are required by those principals in order to perform necessary tasks. The least-privilege strategy may improve security by reducing the granting of unnecessary permissions. However, customers of an identity management service may often be reluctant to remove permissions from a principal, for example because the customers may often be unsure of which permissions are, and are not, required by that principal. To assist customers in these determinations, neural network models may be employed to analyze a principal's permission usage history and to make predictions regarding which permissions are, and are not, likely to be used by a principal in the future. Specifically, when a neural network model determines that a given permission is likely to be used in the future, a recommendation may be made to keep the given permission. By contrast, when a neural network model determines that a given permission is unlikely to be used in the future, a recommendation may be made to remove the given permission.

In some examples, these permission usage prediction neural network models may be periodically updated, such as when additional data is collected or as customer usage trends change over time. These periodic updates might lead to a customer problem if they cause the recommendations to change drastically after each update. Earning and maintaining customer trust may be key to the success of the recommendations because it is ultimately up to the customer to follow or ignore the recommendations. An unintended change may sometimes occur when a new neural network model causes a recommendation to change.

In one example scenario, a recommendation may be made to remove a permission for a principal, such as a permission to access a given resource. Now suppose that after this recommendation is made, the principal does not use the permission to access the resource. In this scenario, the customer may expect that the removal recommendation should remain because the permission has not been used. Now suppose that, after the removal recommendation is made, a neural network model is updated, and this deployed update causes the removal recommendation to flip to a keep recommendation. In this scenario, the flip of this recommendation (from remove to keep) may be unexpected and may not make sense to the customer. This may erode customer trust. In some examples, to prevent this type of scenario, the tool described herein may be used to test the new neural network model prior to its deployment. Specifically, the tool may be used to search for scenarios in which a removal recommendation was flipped to a keep recommendation even though a corresponding permission was not used after the removal recommendation was made. If any such scenarios are identified by the tool, the new neural network model may be retrained. The new neural network model may not be deployed until it is confirmed that no such scenarios exist (or that the occurrence of such scenarios drops below a selected threshold).

FIG. 1 is a diagram illustrating an example neural network model evolution testing system that may be used in accordance with the present description. As shown in FIG. 1, a model evolution 130 may be performed in which a new neural network model 120 is trained as an update to an old neural network model 110. The old neural network model 110 includes an input layer 111, a hidden layer 112 and an output layer 113. As should be appreciated, while a single hidden layer (hidden layer 112) is shown in FIG. 1, the old neural network model 110 may include any number of hidden layers—or may not include any hidden layers. Generally, the input layer 111 may receive inputs to the old neural network model 110, while the output layer 113 may provide the outputs (e.g., results) from the old neural network model 110. In this example, the input layer 111 includes artificial neurons 111A-C, the hidden layer 112 includes artificial neurons 112A-D and the output layer 113 includes artificial neurons 113A-B. The artificial neurons 111A-C, 112A-D and 113A-B are nodes of the old neural network model 110 that may receive one or more inputs and may produce a single output. It is noted that artificial neurons 111A-C, 112A-D and 113A-B are merely non-limiting examples—and the input layer 111, hidden layer 112 and an output layer 113 may include different quantities and/or layouts of artificial neurons.

Similarly, the new neural network model 120 includes an input layer 121, a hidden layer 122 and an output layer 123. As should be appreciated, while a single hidden layer (hidden layer 122) is shown in FIG. 1, the new neural network model 120 may include any number of hidden layers—or may not include any hidden layers. Generally, the input layer 121 may receive inputs to the new neural network model 120, while the output layer 123 may provide the outputs (e.g., results) from the new neural network model 120. In this example, the input layer 121 includes artificial neurons 121A-C, the hidden layer 122 includes artificial neurons 122A-D and the output layer 123 includes artificial neurons 123A-B. The artificial neurons 121A-C, 122A-D and 123A-B are nodes of the new neural network model 120 that may receive one or more inputs and may produce a single output. It is noted that artificial neurons 121A-C, 122A-D and 123A-B are merely non-limiting examples—and the input layer 121, hidden layer 122 and an output layer 123 may include different quantities and/or layouts of artificial neurons.

The old neural network model 110 and the new neural network model 120 may be employed to perform the same, or similar types of, analyses, such as to solve the same problem. However, there are differences between the old neural network model 110 and the new neural network model 120. The new neural network model 120 is trained subsequent to the training of the old neural network model 110. Additionally, the old neural network model is trained using old training dataset 114, and the new neural network model 120 is trained using new training dataset 124. The new training dataset 124 is at least partially different from the old training dataset 114. For example, the new neural network model 120 may be trained to account for the availability of new information and/or to refine a model architecture.

In the example of FIG. 1, evolution verification tool 100 may test and analyze the new neural network model 120 in comparison to the old neural network model 110. Specifically, the evolution verification tool 100 may be employed to test the new neural network model 120 after training (or after one or more iterations of training) of the new neural network model 120 but prior to release and deployment of the new neural network model 120. The evolution verification tool 100 may perform a similarity analysis 101, which is an analysis indicating a similarity relationship between the new neural network model 120 and the old neural network model 110. In some examples, as part of similarity analysis 101, the evolution verification tool 100 may search through at least part of an input region to attempt to find scenarios in which the old neural network model 110 and the new neural network model 120 provide different results for corresponding inputs. In some cases, the similarity analysis 101 may indicate one or more corresponding inputs for which the new neural network model 120 and the old neural network model 110 provide non-equivalent results. Also, in some cases, the similarity analysis 101 may indicate a ratio of corresponding inputs for which the new neural network model 120 and the old neural network model 110 provide non-equivalent results in comparison to a total number of corresponding inputs in an input region.

As also shown in FIG. 1, based on the results of similarity analysis 101, a determination may be made as whether similarity criteria are satisfied for deployment of the new neural network model 120. Specifically, in some scenarios, based on the results of similarity analysis 101, a determination 141 may be made that the similarity criteria are satisfied. In these scenarios, a determination 151 may be made to deploy the new neural network model 120. By contrast, in some scenarios, a determination 142 may be made that the similarity criteria are not satisfied. In these scenarios, a determination 152 may be made to retrain the new neural network model 120. As will be described in detail below, a variety of similarity criteria may be employed. For example, in some cases, the similarity criteria may require that, when any differences are detected in the results provided by the new neural network model 120 and the old neural network model 110 for any valid corresponding inputs, the new neural network model will be retrained. By contrast, in some examples, the similarity criteria may require retraining based on other factors, such as when the ratio of non-equivalent results to total results exceeds a selected threshold ratio.

Figure 2A:
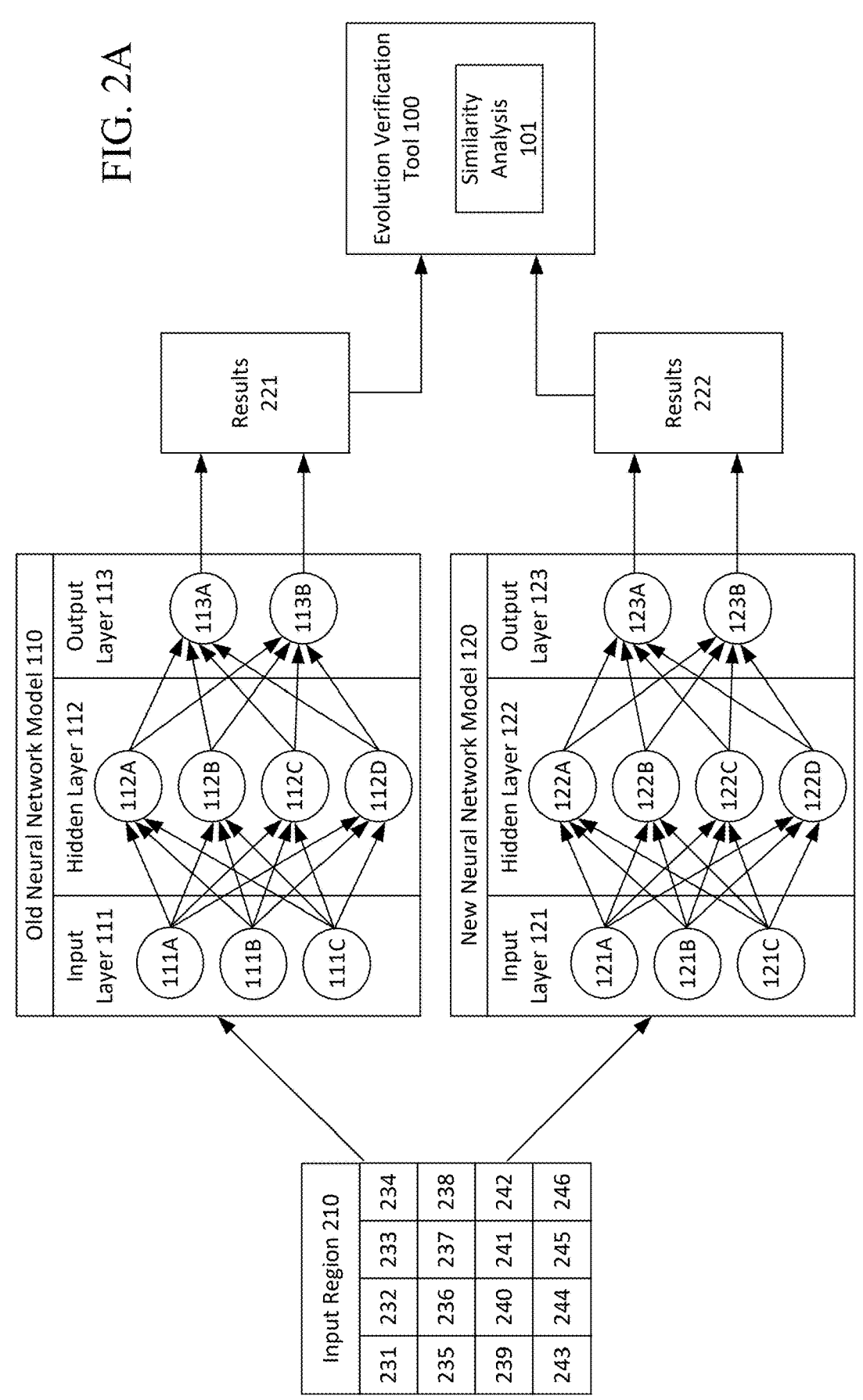
FIG. 2A is a diagram illustrating example similarities of subregions within an input region that may be used in accordance with the present description.

Referring now to FIG. 2A, an example, input region 210 is shown. The input region 210 includes input data that is input to old neural network model 110 and new neural network model 120. It is noted that the input region 210 does not necessarily include all possible inputs to old neural network model 110 and new neural network model 120. Rather, the input region 210 may be a region of inputs for which the new neural network model 12 and the old neural network model 110 are expected to provide the same results. To perform the search of the input region 210, the evolution verification tool 100 may compare results 221, which are provided by the old neural network model 110, to results 222, which are provided by the new neural network model 120. In some examples, the evolution verification tool 100 may employ specialized satisfiability modulo theories (SMT) solvers to compare results 221, which are provided by the old neural network model 110, to results 222, which are provided by the new neural network model 120.

Specifically, the input region 210 includes subregions 231-246. Each subregion 231-246 may have a respective result pair. Each result pair may include a first result provided by the old neural network model 110 for the respective subregion 231-246 and a second result provided by the new neural network model 120 for the same respective subregion 231-246. For each subregion 231-246, the evolution verification tool 100 may compare the first result to the second result within the result pair for the subregion 231-246. The evolution verification tool 100 may search the input region 210 to attempt to find a subregion of the input region that has a non-equivalent result pair, which is a result pair in which the first result provided by a first neural network model (e.g., the old neural network model 110) is different from the second result provided by a second neural network model (e.g., the new neural network model 120). By contrast, an equivalent result pair is a result pair in which the first result provided by the first neural network model (e.g., old neural network model 110) is the same as the second result provided by a second neural network model (e.g., the new neural network model 120). In some examples, if the evolution verification tool 100 is unable to find any subregions within the input region 210 that have non-equivalent result pairs, then this indicates that there are no unintended changes in results provided by the new neural network model 120 as compared to the old neural network model 110. This indicates that the new neural network model 120 is ready to deploy.

By contrast, in some examples, if the evolution verification tool 100 detects a non-equivalent result pair within the input region 210, then this may indicate that further processing is required. In some cases, upon detecting a non-equivalent result pair, the validity of the input values for the respective subregion 231-246 may be examined to check their validity. Specifically, in some cases, input values may be valid when the input values correspond to an existing customer usage pattern. By contrast, in some examples, the input values may be invalid when the input values do not correspond to any existing customer usage pattern. The reason for this is that input values that do not correspond to any existing customer usage pattern may be considered irrelevant, and it would not be practical to delay deployment of the new neural network model 120 because of changes that do not actually impact any customers. For scenarios in which the input values are invalid, the input region 210 may be refined so as to exclude the invalid input values, and the search may be re-executed with a refined input region.

For scenarios in which the non-equivalent result pair is based on valid input values, it may be determined that the new neural network model 120 is resulting in relevant unintended changes and is, therefore, not yet ready to deploy. In these scenarios, the new neural network model 120 may be retrained in order to correct the relevant unintended changes. In some examples, in order to increase the likelihood that the relevant unintended changes will be corrected, synthetic training data may be added into the training data set that is used for the retraining. The synthetic training data may include data representative of the input values for the detected non-equivalent result pair and indications of desired and/or non-desired results for those input values. In some examples, the process of comparing result pairs, detecting a non-equivalent result pair, and retraining the new neural network model may be repeated until the evolution verification tool 100 is able to confirm that there are no non-equivalent result pairs within the input region 210. Once it is confirmed that there are no non-equivalent result pairs, the new neural network model 120 may be deployed.

In some examples, a variety of strategies may be employed for analyzing similarity across the input region 210. Some examples of these strategies may include an eager computational strategy, a smart computational strategy, and a hybrid strategy. An example of the eager computational strategy is shown in FIG. 2A. In the eager computational strategy, the input region 210 may be partitioned into subregions of a threshold size (e.g., subregions 231-246). One or more of the subregions 231-246 may then be analyzed for non-equivalent result pairs until it is either determined that there are no non-equivalent result pairs (and the new neural network model 120 is ready to deploy) or that there is at least one non-equivalent result pair that triggers model retraining.

In the smart computational approach, a non-equivalent parent region may be determined within the input region 210 that includes at least one non-equivalent result pair. In some examples, the non-equivalent parent region may be the entire input region 210 (if the input region 210 includes at least one non-equivalent result pair). The non-equivalent parent may then be iteratively partitioned into descendant regions until a threshold partition size is reached. In some examples, the smart computational strategy may improve efficiency and reduce the time and resources required to analyze similarity, for example as compared to the eager computational strategy. One reason for this is that the smart computational strategy does not require all of subregions 231-246 of the threshold size to be individually analyzed.

Figure 2B:
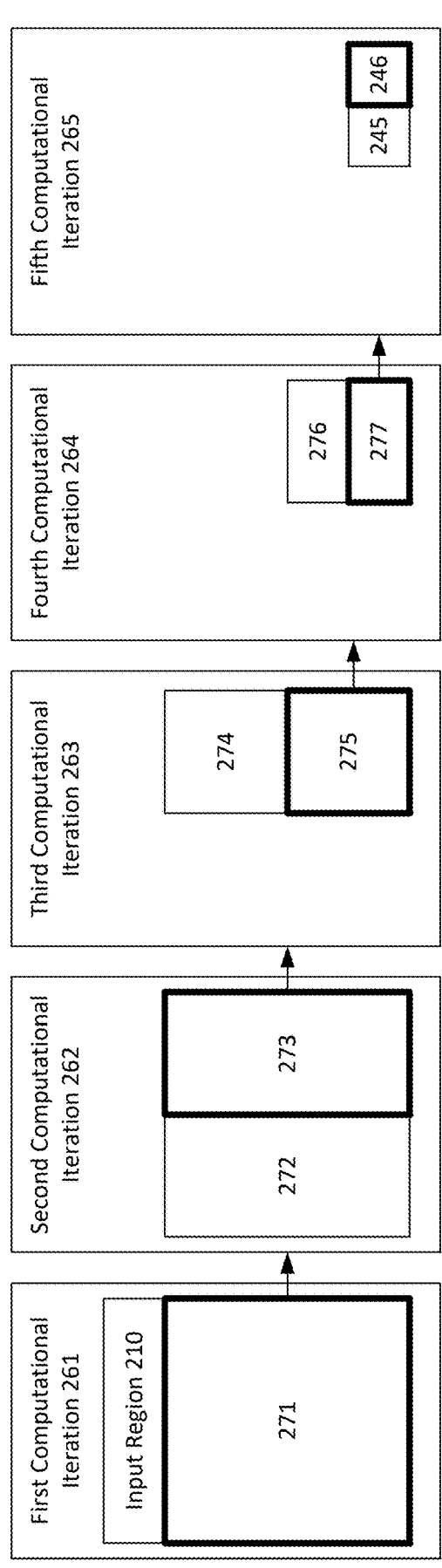
FIG. 2B is a diagram illustrating example iterations of a smart computational strategy for a similarity analysis that may be used in accordance with the present description.

An example of the smart computational strategy is shown in FIG. 2B. As shown in FIG. 2B, in a first computational iteration 261, result pairs across the entire input region 210 may be merged into a merged result set. The merged result set for input region 210 may then be analyzed to determine whether the merged result set includes at least one non-equivalent result pair. In this example, it is determined that the merged result set includes at least one non-equivalent result pair. Based on this, it is determined that the input region 210 is a non-equivalent parent region 271. A non-equivalent region is a region within input region 210 that includes at least one non-equivalent result pair. Non-equivalent parent region 271 is shown with thick outlining to indicate that it is a non-equivalent region.

It is noted that, while the analysis of the merged result set may indicate that there is at least one non-equivalent result pair within the non-equivalent parent region 271, the exact locations of these non-equivalent result pairs within the non-equivalent parent region 271 may be unknown. Accordingly, in order to locate the non-equivalent result pairs, the non-equivalent parent region 271 may be iteratively partitioned (e.g., bifurcated). As shown in FIG. 2B, in a second computational iteration 262, the non-equivalent parent region 271 is partitioned (e.g., bifurcated) into descendant regions 272 and 273. Merged result pair sets for descendant regions 272 and 273 may then be analyzed to determine whether they include at least one non-equivalent result pair. In this example, it is determined that the merged result set for descendant region 272 does not include any non-equivalent result pairs. By contrast, it is determined that the merged result set for descendant region 273 includes at least one non-equivalent result pair. Based on this, it is determined that descendant region 273 is a non-equivalent region. Descendant region 271 is shown with thick outlining to indicate that it is a non-equivalent region.

In a third computational iteration 263, descendant region 273 is partitioned (e.g., bifurcated) into descendant regions 274 and 275. Merged result pair sets for descendant regions 274 and 275 may then be analyzed to determine whether they include at least one non-equivalent result pair. In this example, it is determined that the merged result set for descendant region 274 does not include any non-equivalent result pairs. By contrast, it is determined that the merged result set for descendant region 275 includes at least one non-equivalent result pair. Based on this, it is determined that descendant region 275 is a non-equivalent region. Descendant region 275 is shown with thick outlining to indicate that it is a non-equivalent region.

In a fourth second computational iteration 264, descendant region 275 is partitioned (e.g., bifurcated) into descendant regions 276 and 277. Merged result pair sets for descendant regions 276 and 277 may then be analyzed to determine whether they include at least one non-equivalent result pair. In this example, it is determined that the merged result set for descendant region 276 does not include any non-equivalent result pairs. By contrast, it is determined that the merged result set for descendant region 277 includes at least one non-equivalent result pair. Based on this, it is determined that descendant region 277 is a non-equivalent region. Descendant region 277 is shown with thick outlining to indicate that it is a non-equivalent region.

In a fifth computational iteration 265, descendant region 277 is partitioned (e.g., bifurcated) into descendant regions, which are subregions 245 and 246. Result pairs for subregions 245 and 246 may then be analyzed to determine whether they are a non-equivalent result pair. In this example, it is determined that the result pair for subregion 245 is an equivalent result pair. By contrast, it is determined that the result pair for subregion 246 is a non-equivalent result pair. In this example, subregions 245 and 246 are equivalent to the threshold partition size. Accordingly, in this example, subregion 246 is not further partitioned. In some examples, a hybrid strategy may be employed which is a hybrid of the eager computational strategy and the smart computational strategy.

Figure 3:
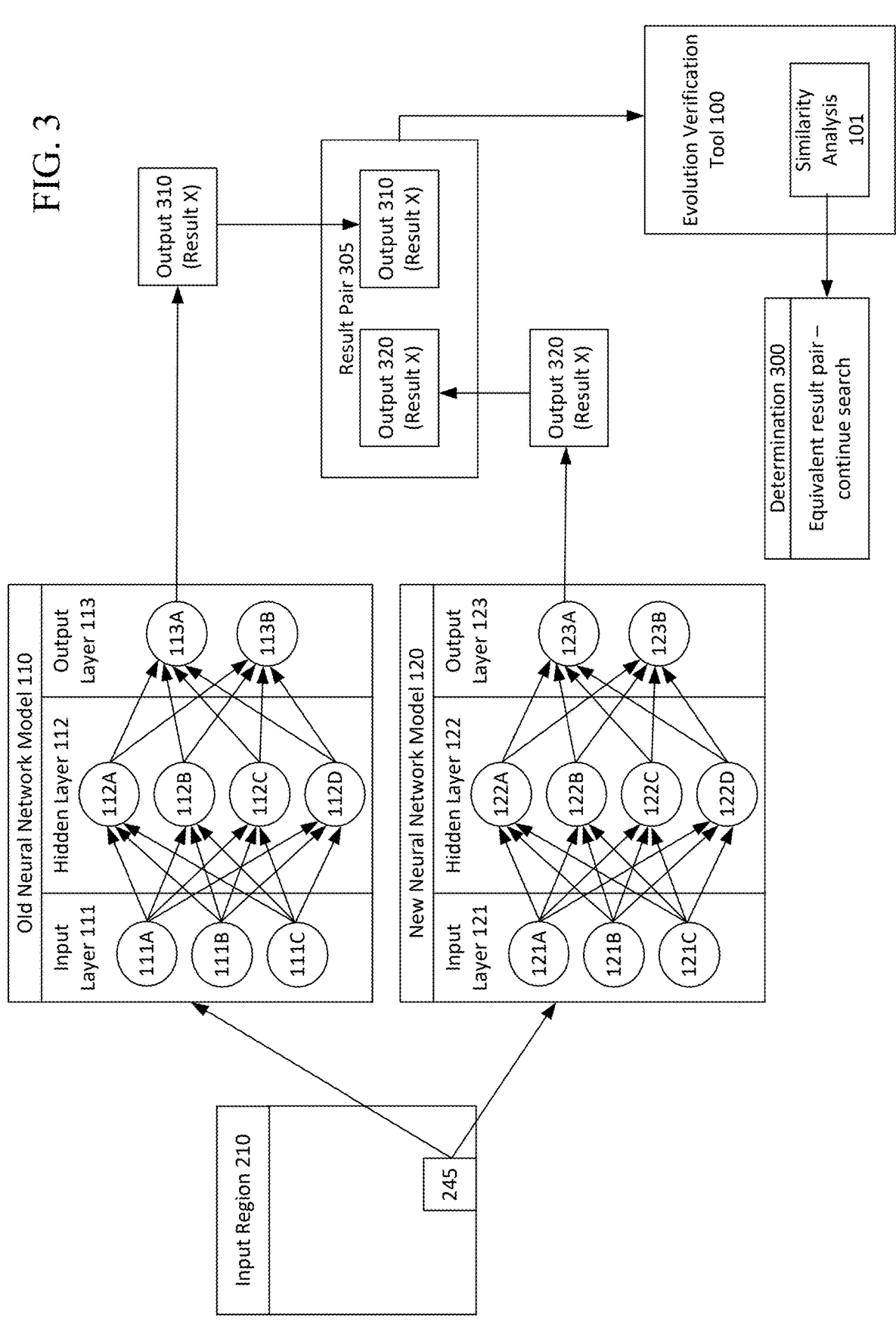
FIG. 3 is a diagram illustrating an example equivalent result pair for a first subregion of an input region that may be used in accordance with the present description.

Some examples of the above-described input region searching techniques will now be described in detail. Specifically, referring now to FIG. 3, an example is shown in which outputs for a given subregion are analyzed and determined to be equivalent to one another. As shown in FIG. 3, evolution verification tool 100 provides input data corresponding to subregion 245 of input region 210 to both old neural network model 110 and new neural network model 120. In this example, the old neural network model 110 analyzes the input from subregion 245 and provides output 310, which includes Result X. Additionally, in this example, the new neural network model 120 analyzes the input from subregion 245 and provides output 320, which also includes Result X. Output 310 (from old neural network model 110) and output 320 (from new neural network model 120) form a result pair 305 corresponding to subregion 245.

As also shown in FIG. 3, the evolution verification tool 100 may analyze result pair 305 as part of similarity analysis 101. Specifically, the evolution verification tool 100 may determine that, within result pair 305, both the old neural network model 110 and new neural network model 120 have provided the same result, which is Result X. Thus, the evolution verification tool 100 may determine that result pair 305 for subregion 245 is an equivalent result pair. As shown, determination 300 indicates that subregion 245 has an equivalent result pair and that the search of input region 210 will continue, such as by analyzing outputs for a next subregion within the input region 210.

Figure 4:
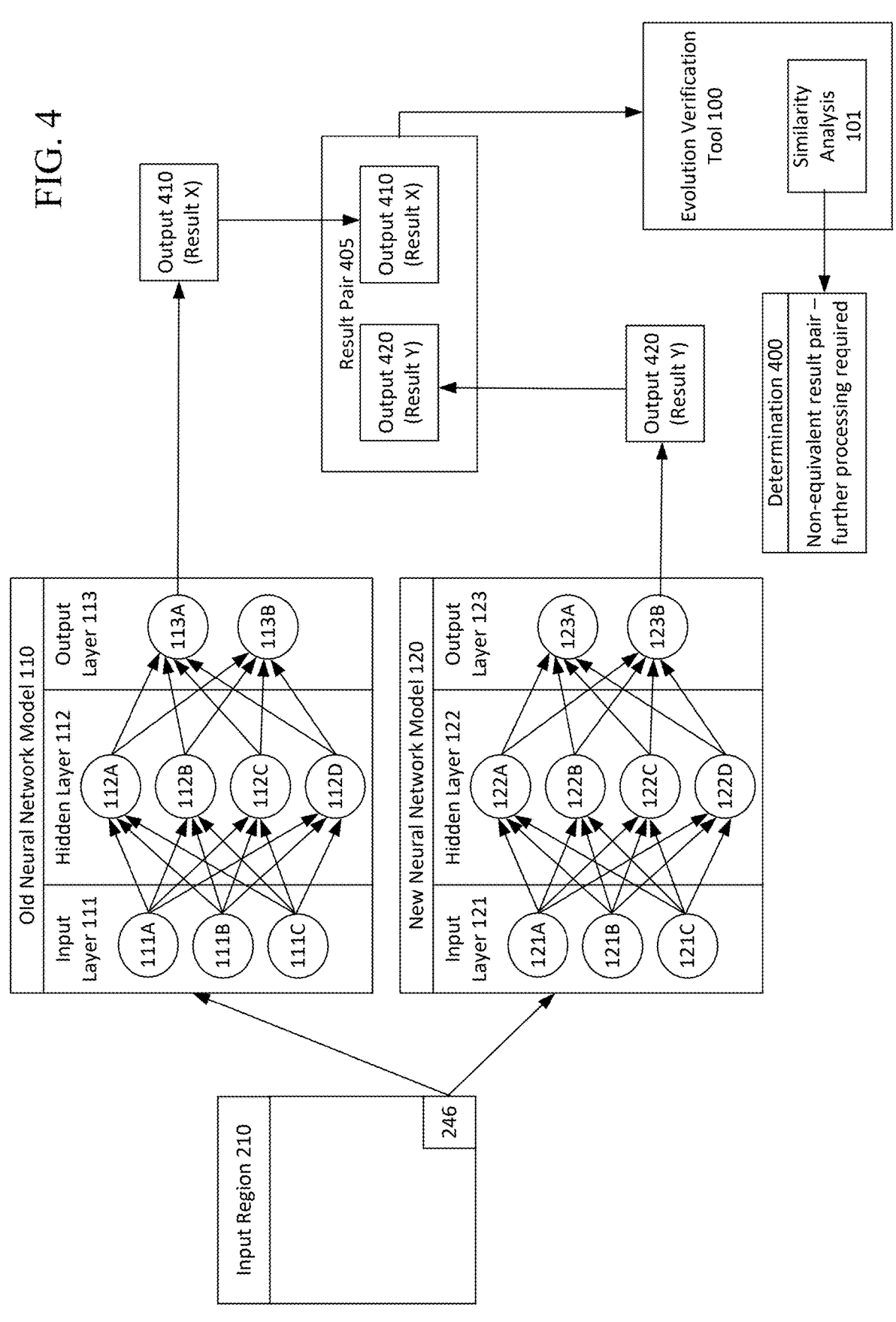
FIG. 4 is a diagram illustrating an example non-equivalent result pair for a second subregion of an input region that may be used in accordance with the present description.

Referring now to FIG. 4, an example is shown in which outputs for a given subregion are analyzed and determined to be non-equivalent to one another. As shown in FIG. 4, evolution verification tool 100 provides input data corresponding to subregion 246 of input region 210 to both old neural network model 110 and new neural network model 120. In this example, the old neural network model 110 analyzes the input from subregion 246 and provides output 410, which includes Result X. By contrast, in this example, the new neural network model 120 analyzes the input from subregion 246 and provides output 420, which includes Result Y. Result Y is different from Result X. Output 310 (from old neural network model 110) and output 320 (from new neural network model 120) form a result pair 405 corresponding to subregion 246.

As also shown in FIG. 4, the evolution verification tool 100 may analyze result pair 405 as part of similarity analysis 101. Specifically, the evolution verification tool 100 may determine that, within result pair 405, the old neural network model 110 has provided Result X, and new neural network model 120 has provided Result Y, which is different from Result X. Thus, the evolution verification tool 100 may determine that result pair 405 for subregion 246 is a non-equivalent result pair. As shown, determination 400 indicates that subregion 246 has a non-equivalent result pair and that further processing is required. As described above, this further processing may include determining whether the inputs for subregion 246 are valid, meaning that they correspond to an existing customer usage pattern. If the inputs for subregion 246 are invalid, then the input region 210 may be refined so as to exclude the invalid input values, and the search may be re-executed with a refined input region. If the inputs for subregion 246 are valid, then the new neural network model 120 may be retrained. In some examples, in order to increase the likelihood that relevant unintended changes will be corrected, synthetic training data may be added into the training data set that is used for the retraining. The synthetic training data may include data representative of the input values for subregion 246 and indications of desired and/or non-desired results for those input values.

Figure 5:
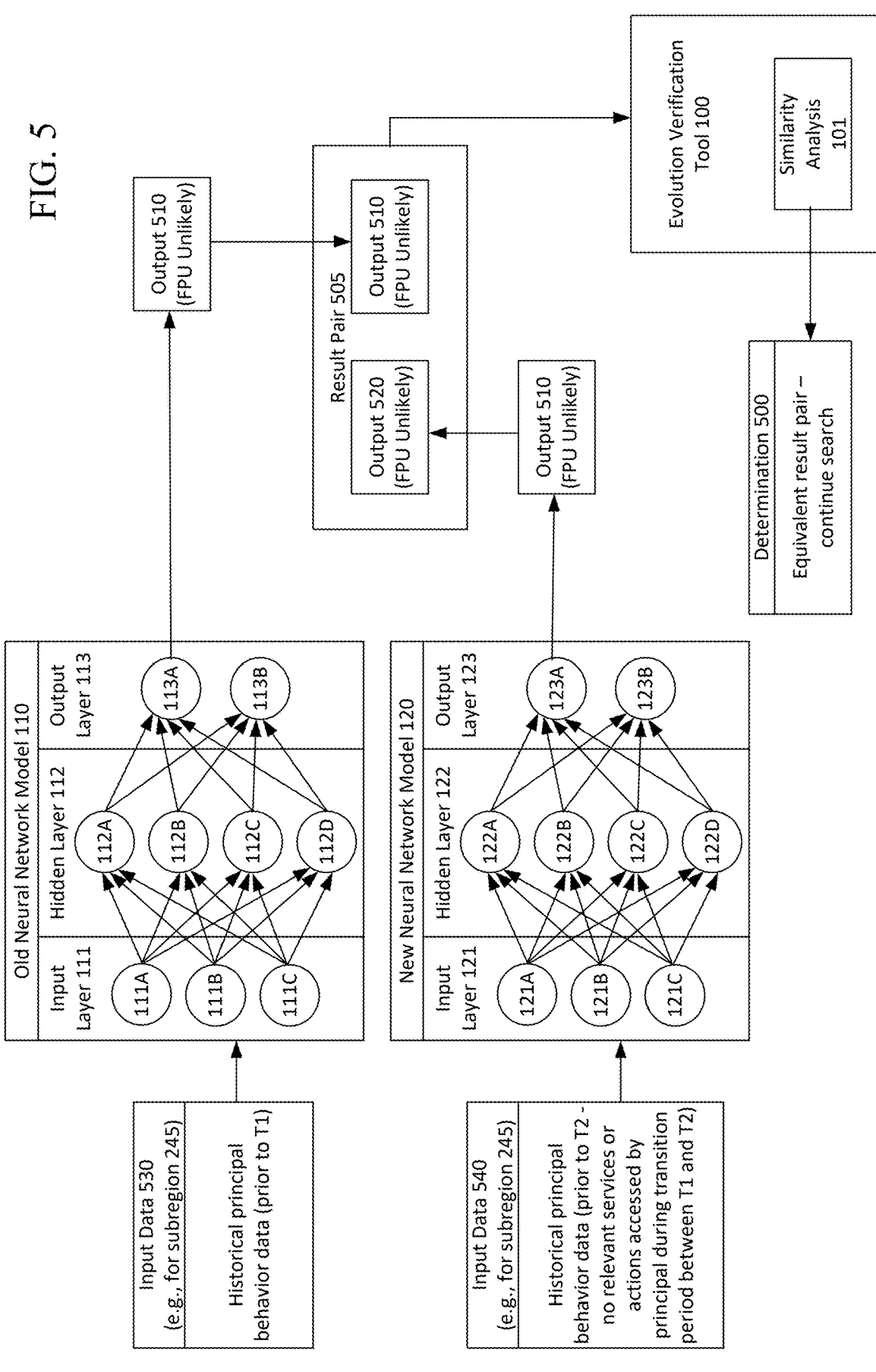
FIG. 5 is a diagram illustrating an example equivalent result pair for an example testing application that may be used in accordance with the present description.
Figure 6:
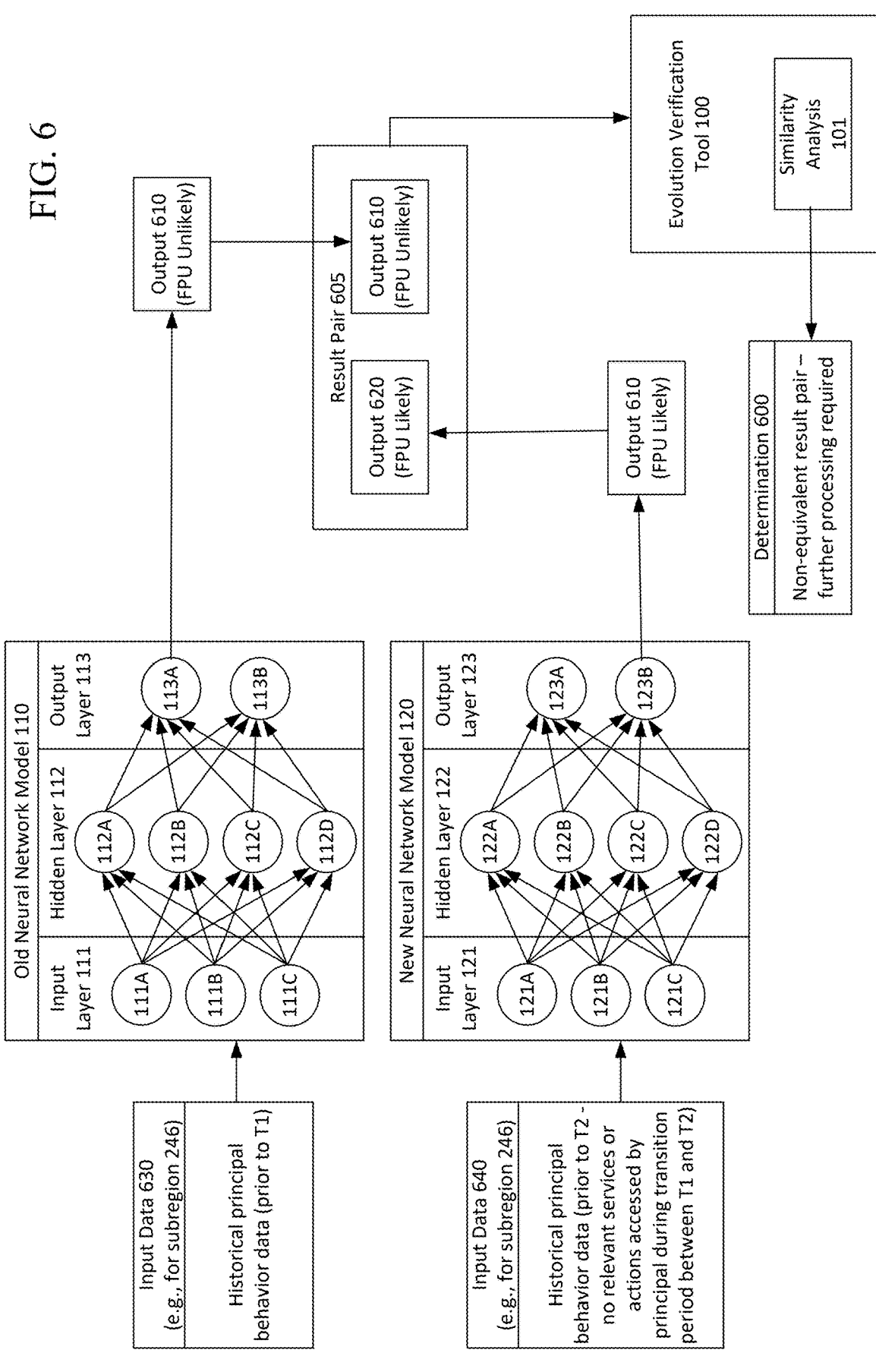
FIG. 6 is a diagram illustrating an example non-equivalent result pair for the example testing application that may be used in accordance with the present description.

Referring now to FIGS. 5-6, some examples are shown in which the old neural network model 110 and the new neural network model 120 may make predictions regarding customer usage of identity and access management permissions. Specifically, the old neural network model 110 and the new neural network model 120 may be employed to analyze a principal's permission usage history and to make predictions regarding which permissions are, and are not, likely to be used by a principal in the future. Specifically, when a determination is made that a given permission is likely to be used in the future, a recommendation may be made to keep the given permission. By contrast, when a determination is made that a given permission is unlikely to be used in the future, a recommendation may be made to remove the given permission. In some examples, permission usage prediction neural network models may be periodically updated, such as when additional data is collected or as customer usage trends change over time. These periodic updates might lead to a customer problem if they cause the recommendations to change drastically after each update. Earning and maintaining customer trust may be key to the success of the recommendations because it is ultimately up to the customer to follow or ignore the recommendations.

As described above, in one example scenario, a recommendation may be made to remove a permission for a principal, such as a permission to access a given resource. Now suppose that after this recommendation is made, the principal does not use the permission to access the resource. In this scenario, the customer may expect that the removal recommendation should remain because the permission has not been used. Now suppose that, after the removal recommendation is made, an updated neural network model is deployed, and this deployed update causes the removal recommendation to flip to a keep recommendation. In this scenario, the flip of this recommendation (from remove to keep) may be unexpected and may not make sense to the customer. This may erode customer trust.

In some examples, to prevent this type of scenario, the evolution verification tool 100 may be used to test the new neural network model 120 prior to its deployment. Specifically, the evolution verification tool 100 may be used to search for scenarios in which a removal recommendation was flipped to a keep recommendation even though a corresponding permission was not used after the removal recommendation was made. If any such scenarios are identified by the evolution verification tool 100, the new neural network model 120 may be retrained. The new neural network model 120 may not be deployed until it is confirmed that no such scenarios exist (or that the occurrence of such scenarios drops below a selected threshold).

Thus, in some examples, evolution verification tool 100 may be used to help ensure that the old neural network model 110 and the new neural network model 120 will provide consistent recommendations to customers. Specifically, evolution verification tool 100 may search through input region 210 to attempt to find a subregion for which the new neural network model 120 and the old neural network model 110 predict different likelihoods of future permission usage, thereby resulting in different recommendation to customers. Referring now to FIG. 5, an example is shown in which future permission usage predictions for a given subregion (e.g., subregion 245) are analyzed and determined to be equivalent to one another. As shown in FIG. 5, evolution verification tool 100 provides input data 530 to old neural network model 110. Additionally, evolution verification tool 100 provides input data 540 to new neural network model 120. Both input data 530 and input data 540 correspond to the same subregion (e.g., subregion 245) of input region 210.

The input data 530 and the input data 540 may be based on a Time T1 and a Time T2. Time T1 represents a time at which a prediction may be made by the old neural network model 110. Time T2 represents a time at which a prediction may be made by the new neural network model 120. Time T2 is subsequent to Time T1, and Time T2 and Time T1 are separated by a transition period. In this example, input data 530 includes historical principal behavior data prior to Time T1 for a given principal (Principal X). For example, input data 530 may indicate services and actions that are accessed by Principal X prior to Time T1. The input data 530 may also indicate metadata, such as times of access, types of access (e.g., read, write, etc.).

The input data 540 may include historical principal behavior data prior to Time T2. For example, input data 540 may indicate services and actions that are accessed by Principal X prior to Time T2. The input data 540 may also indicate metadata, such as times of access, types of access (e.g., read, write, etc.). In this example, during the transition period (the time between T1 and T2), Principal X does not access any relevant services or actions. For this reason, it is expected that, if the old neural network model 110 predicts that Principal X is unlikely to use a given permission in the future, the new neural network model 120 should also predict that Principal X is unlikely to use a given permission in the future.

It is noted that, although input data 530 and input data 540 correspond to the same respective subregion (e.g., subregion 245) of input region 210, the input data 530 and the input data 540 are not completely identical to one another. In this example, although input data 530 and input data 540 include historical behavior data for the same principal (e.g., Principal X), the input data 530 and the input data 540 relate to different time periods. Thus, there is no requirement that completely identical input data must be provided to the old neural network model 110 and the new neural network model 120 for any given respective subregion of the input region 210.

In the example of FIG. 5, the old neural network model 110 analyzes the input data 530 and provides output 510, which includes a prediction that future permission usage (FPU) by Principal X is unlikely. Additionally, in this example, the new neural network model 120 analyzes the input data 540 and provides output 520, which also includes a prediction that future permission usage (FPU) by Principal X is unlikely. Both of these predictions may result in recommendations to remove the given permission. Output 510 (from old neural network model 110) and output 520 (from new neural network model 120) form a result pair 505 corresponding to subregion 245.

As also shown in FIG. 5, the evolution verification tool 100 may analyze result pair 505 as part of similarity analysis 101. Specifically, the evolution verification tool 100 may determine that, within result pair 505, both the old neural network model 110 and new neural network model 120 have provided the same result, which is a prediction that future permission usage (FPU) by Principal X is unlikely. Thus, the evolution verification tool 100 may determine that result pair 505 for subregion 245 is an equivalent result pair. As shown, determination 500 indicates that subregion 245 has an equivalent result pair and that the search of input region 210 will continue, such as by analyzing outputs for a next subregion within the input region 210.

Referring now to FIG. 6, an example is shown in which future permission usage predictions for a given subregion (e.g., subregion 246) are analyzed and determined to be non-equivalent. As shown in FIG. 6, evolution verification tool 100 provides input data 630 to old neural network model 110. Additionally, evolution verification tool 100 provides input data 640 to new neural network model 120. Both input data 630 and input data 640 correspond to the same respective subregion (e.g., subregion 246) of input region 210.

In this example, input data 630 includes historical principal behavior data prior to Time T1 for a given principal (Principal Y). For example, input data 630 may indicate services and actions that are accessed by Principal Y prior to Time T1. The input data 630 may also indicate metadata, such as times of access, types of access (e.g., read, write, etc.).

The input data 640 may include historical principal behavior data prior to Time T2. For example, input data 640 may indicate services and actions that are accessed by Principal Y prior to Time T2. The input data 640 may also indicate metadata, such as times of access, types of access (e.g., read, write, etc.). In this example, during the transition period (the time between T1 and T2), Principal Y does not access any relevant services or actions. For this reason, it is expected that, if the old neural network model 110 predicts that Principal Y is unlikely to use a given permission in the future, the new neural network model 120 should also predict that Principal Y is unlikely to use a given permission in the future.

In the example of FIG. 6, the old neural network model 110 analyzes the input data 630 and provides output 610, which includes a prediction that future permission usage (FPU) by Principal Y is unlikely. This prediction may result in a recommendation to remove the given permission. By contrast, in this example, the new neural network model 120 analyzes the input data 640 and provides output 620, which includes a prediction that future permission usage (FPU) by Principal Y is likely. This prediction may result in a recommendation to retain the given permission. Output 610 (from old neural network model 110) and output 620 (from new neural network model 120) form a result pair 605 corresponding to subregion 246.

As also shown in FIG. 6, the evolution verification tool 100 may analyze result pair 605 as part of similarity analysis 101. Specifically, the evolution verification tool 100 may determine that, within result pair 605, both the old neural network model 110 and new neural network model 120 have provided different results. In particular, the old neural network model 110 has predicted that future permission usage (FPU) by Principal Y is unlikely, but the new neural network model 120 has predicted that future permission usage (FPU) by Principal Y is likely. Thus, the evolution verification tool 100 may determine that result pair 605 for subregion 246 is a non-equivalent result pair. As shown, determination 600 indicates that subregion 246 has a non-equivalent result pair and that further processing is required.

Figure 7:
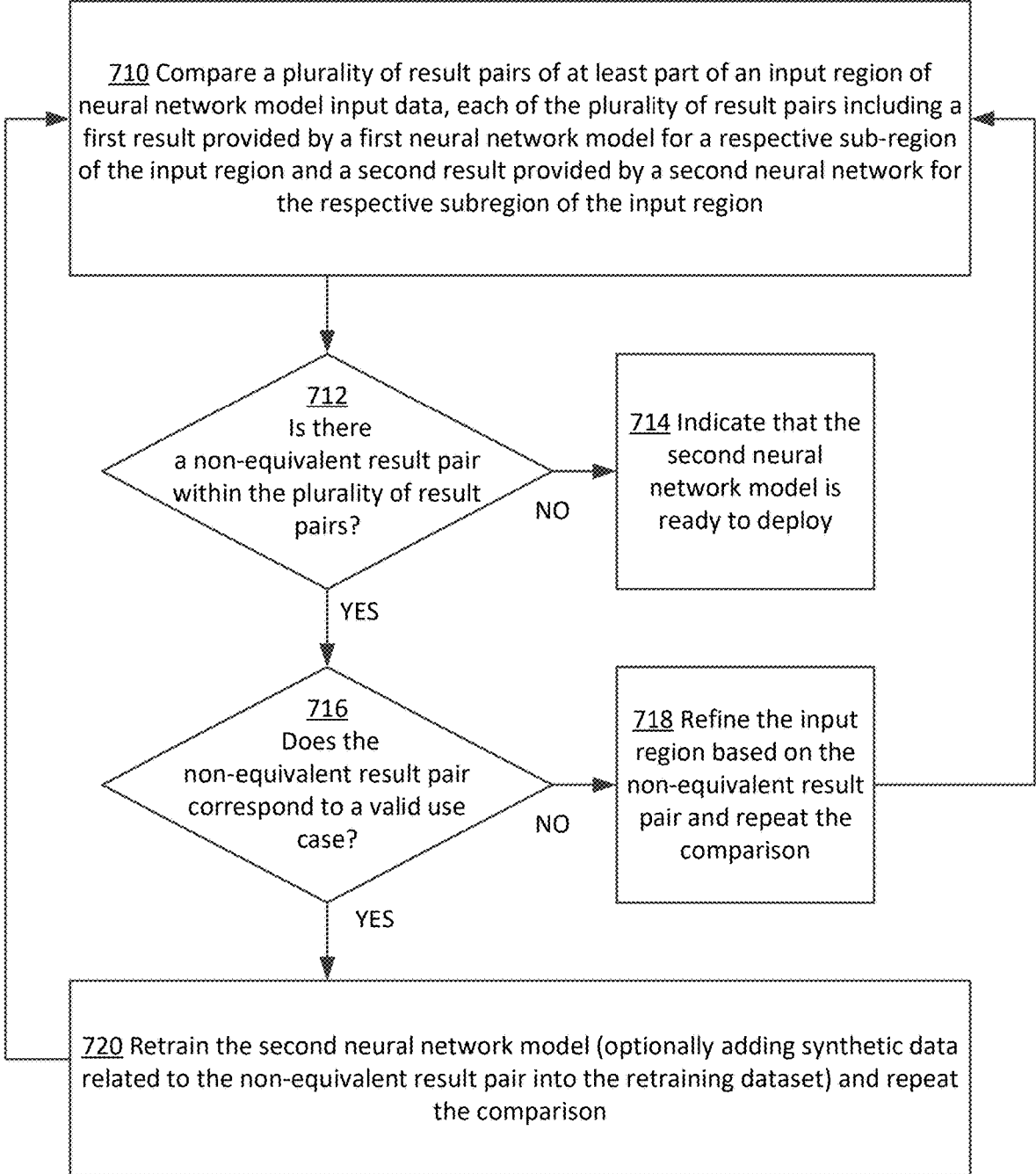
FIG. 7 is a flowchart illustrating an example neural network model evolution testing process that may be used in accordance with the present description.

FIG. 7 is a flowchart illustrating an example neural network model evolution testing process that may be used in accordance with the present description. At operation 710, a plurality of result pairs are compared of at least part of an input region of neural network model input data, each of the plurality of result pairs including a first result provided by a first neural network model for a respective subregion of the input region and a second result provided by a second neural network for the respective subregion of the input region. In some examples, the second neural network model may be an update of the first neural network model. Furthermore, in some examples, the second neural network model may be trained subsequent to training of the first neural network model. Additionally, in some examples, the first neural network model may be trained using a first training dataset, and the second neural network model may be trained using a second training dataset. The second training dataset may be at least partially different from the first training dataset. In some examples, the second training dataset may be derived from the first training dataset, such as by modifying weights, or other relationships or values, in the first training dataset. In one specific example, the first neural network model and the second neural network model provide recommendations related to removal of security permissions.

It is noted that the second neural network model need not necessarily be an update of the first neural network model. In some examples, the second neural network model may be generated by compressing the first neural network model. Also, in some examples, the second neural network model may be generated by adding, and/or removing, artificial neurons to, or from, the first neural network model. In some examples, the second neural network model may not be derived from the first neural network model. In one specific example, the first neural network model may be generated by a first organization or service, and the second neural network model may be generated by a second organization or service, which may be a competitor of the first organization or service.

An example in which the second neural network model is an update of the first neural network model is shown in FIG. 1. As described above with reference to FIG. 1, a model evolution 130 may be performed in which a new neural network model 120 is trained as an update to old neural network model 110. The old neural network model 110 and the new neural network model 120 may be employed to perform the same, or similar types of, analyses, such as to solve the same problem. However, there are differences between the old neural network model 110 and the new neural network model 120. The new neural network model 120 is trained subsequent to the training of the old neural network model 110. Additionally, the old neural network model is trained using old training dataset 114, and the new neural network model 120 is trained using new training dataset 124. The new training dataset 124 is at least partially different from the old training dataset 114. For example, the new neural network model 120 may be trained to account for the availability of new information and/or to refine a model architecture.

As also described above, evolution verification tool 100 may test and analyze the new neural network model 120 in comparison to the old neural network model 110. Specifically, the evolution verification tool 100 may be employed to test the new neural network model 120 after training (or after one or more iterations of training) of the new neural network model 120 but prior to release and deployment of the new neural network model 120. The evolution verification tool 100 may perform a similarity analysis 101, which is an analysis indicating a similarity relationship between the new neural network model 120 and the old neural network model 110. In some examples, as part of similarity analysis 101, the evolution verification tool 100 may search through at least part of an input region to attempt to find scenarios in which the old model and the new model provide different results for corresponding inputs. In some examples, the evolution verification tool 100 may employ specialized satisfiability modulo theories (SMT) solvers to compare results 221, which are provided by the old neural network model 110, to results 222, which are provided by the new neural network model 120.

As shown in FIG. 2A, the input region 210 includes input data that is input to old neural network model 110 and new neural network model 120. To perform the search of the input region 210, the evolution verification tool 100 may compare results provided by the old neural network model 110 and the new neural network model 120. Specifically, the input region 210 includes subregions 231-246. Each subregion 231-246 may have a respective result pair. Each result pair may include a first result provided by the old neural network model 110 for the respective subregion 231-246 and a second result provided by the new neural network model 120 for the same respective subregion 231-246. For each subregion 231-246, the evolution verification tool 100 may compare the first result to the second result within the result pair for the subregion 231-246. The evolution verification tool 100 may search the input region 210 to attempt to find a subregion of the input region that has a non-equivalent result pair, which is a result pair in which the first result provided by the first neural network model (e.g., old neural network model 110) is different from the second result provided by the second neural network model (e.g., new neural network model 120).

At operation 712, it is determined whether there exists a non-equivalent result pair within the plurality of result pairs. As described above, the first result of the non-equivalent result pair provided by the first neural network model differs from the second result of the non-equivalent result pair provided by the second neural network model. Some examples of non-equivalent result pairs are described above with reference to FIGS. 4 and 6. As shown in FIG. 4, evolution verification tool 100 provides input data corresponding to subregion 246 of input region 210 to both old neural network model 110 and new neural network model 120. In this example, the old neural network model 110 analyzes the input from subregion 246 and provides output 410, which includes Result X. By contrast, in this example, the new neural network model 120 analyzes the input from subregion 246 and provides output 420, which includes Result Y. Result Y is different from Result X. Output 310 (from old neural network model 110) and output 320 (from new neural network model 120) form a result pair 405 corresponding to subregion 246. The evolution verification tool 100 may determine that, within result pair 405, the old neural network model 110 has provided Result X, and new neural network model 120 has provided Result Y, which is different from Result X. Thus, the evolution verification tool 100 may determine that result pair 405 for subregion 246 is a non-equivalent result pair.

In the example of FIG. 6, the old neural network model 110 analyzes the input data 630 and provides output 610, which includes a prediction that future permission usage (FPU) by Principal Y is unlikely. This prediction may result in a recommendation to remove the given permission. By contrast, in this example, the new neural network model 120 analyzes the input data 640 and provides output 620, which includes a prediction that future permission usage (FPU) by Principal Y is likely. This prediction may result in a recommendation to retain the given permission. Output 610 (from old neural network model 110) and output 620 (from new neural network model 120) form a result pair 605 corresponding to subregion 246. The evolution verification tool 100 may determine that, within result pair 605, both the old neural network model 110 and new neural network model 120 have provided different results. In particular, the old neural network model 110 has predicted that future permission usage (FPU) by Principal Y is unlikely, but the new neural network model 120 has predicted that future permission usage (FPU) by Principal Y is likely. Thus, the evolution verification tool 100 may determine that result pair 605 for subregion 246 is a non-equivalent result pair.

As described above, in some examples, a variety of strategies may be employed for analyzing similarity across the input region 210. Some examples of these strategies may include the eager computational strategy, the smart computational strategy, and the hybrid strategy, each of which is described in detail above. In the eager computational strategy, determining that there exists a non-equivalent result pair within the plurality of result pairs may include partitioning the input region 210 into subregions of a threshold size (e.g., subregions 231-246 of FIG. 2A). One or more of subregions 231-246 may then be analyzed for non-equivalent result pairs until it is either determined that there are no non-equivalent result pairs (and the new neural network model 120 is ready to deploy) or that there is at least one non-equivalent result pair that triggers model retraining. In the smart computational approach, determining that there exists a non-equivalent result pair within the plurality of result pairs may include determining a non-equivalent parent region within the input region that includes at least one non-equivalent result pair and iteratively partitioning (e.g., bifurcating) the non-equivalent parent region into descendant regions until a threshold partition size is reached. Each of the descendant regions that is a non-equivalent region may be partitioned into two or more other of the descendant regions until the threshold partition size is reached. By contrast, each of the descendant regions that is not a non-equivalent region may not be further partitioned.

If, at operation 712, it is determined that there are no non-equivalent result pairs within the plurality of result pairs, then the process proceeds to operation 714, at which it is indicated that the second neural network model is ready to deploy. Thus, it may be indicated, based on an absence of the non-equivalent result pairs within the input region, that the second neural network model is ready to deploy. As described above, if the evolution verification tool 100 is unable to find any non-equivalent result pairs within the input region, then this indicates that there are no unintended changes in results provided by the new neural network model as compared to the old neural network model. This indicates that the new neural network model is ready to deploy. As part of operation 712, the evolution verification tool 100 may provide an alert or other message to a user indicating that no unintended changes are detected in results provided by the new neural network model as compared to the old neural network model, and that the new neural network model is therefore ready to deploy. The new neural network model may then be deployed based on this indication.

By contrast, if, at operation 712, it is determined that there is a non-equivalent result pair within the plurality of result pairs, then the process proceeds to operation 716, at which it is determined whether the non-equivalent result pair corresponds to a valid use case. As described above, if the evolution verification tool 100 detects a non-equivalent result pair within the input region, then this may indicate that further processing is required. For example, in some cases, upon detecting a non-equivalent result pair, the validity of the input values for the respective subregion may be examined to check their validity. Specifically, in some cases, input values may be valid when the input values correspond to an existing customer usage pattern. By contrast, in some examples, the input values may be invalid when the input values do not correspond to any existing customer usage pattern. The reason for this is that input values that do not correspond to any existing customer usage pattern may be considered irrelevant, and it would not be practical to delay deployment of the new neural network model because of changes that do not actually impact any customers.

If, at operation 716, it is determined that the non-equivalent result pair does not correspond to a valid use case, then the process proceeds to operation 718, at which the input region is refined based on the non-equivalent result pair and the comparing of operation 710 is repeated using the refined input region. As described above, for scenarios in which the input values for the non-equivalent result pair are invalid (e.g., the input values do not correspond to any existing customer usage pattern), the input region may be refined so as to exclude the invalid input values, and the search may be re-executed with the refined input region. Thus, non-equivalent result pairs that do not correspond to valid use cases may trigger refining of the input region for the comparing.

By contrast, if, at operation 716, it is determined that the non-equivalent result pair does correspond to a valid use case, then the process proceeds to operation 720, at which the second neural network model is retrained. Operation 710 is then repeated using the retrained neural network model. Thus, the second neural network model may be retrained based at least in part on existence of the non-equivalent result pair. Additionally, the retraining may be based in part on the non-equivalent result pair corresponding to a valid use case. As described above, for scenarios in which the non-equivalent result pair is based on valid input values, it may be determined that the new neural network model is resulting in relevant unintended changes and is, therefore, not yet ready to deploy. In these scenarios, the new neural network model may be retrained in order to correct the relevant unintended changes.

In some examples, in order to increase the likelihood that the relevant unintended changes will be corrected, synthetic training data may be added into the training data set that is used for the retraining of the new neural network model. Thus, in some examples, the retraining may be performed using a retraining dataset that includes synthetic data corresponding to the non-equivalent result pair. The synthetic data may include data representative of the input values for the detected non-equivalent result pair and indications of desired and/or non-desired results for those input values.

As also described above, the comparing of the plurality of result pairs across at least part of the input region (at operation 710), the determining that there exists a non-equivalent result pair within the plurality of result pairs (at the YES branch of operation 712), and the retraining of the second neural network model (at operation 720) may be repeated until there are no non-equivalent result pairs within the input region. Once it is confirmed that there are no non-equivalent result pairs, the new neural network model may be deployed.

It is noted that FIG. 7 relates to an example in which only a single non-equivalent result pair with valid input values will cause retraining of the second neural network model. In some examples, however, the second neural network model may be retrained based on other criteria, such as detection of a selected threshold quantity of non-equivalent result pairs (e.g., in which the selected threshold quantity may optionally be greater than one), a determination that a ratio of non-equivalent result pairs to total result pairs exceeds a selected threshold ratio, and other similar criteria.

Figure 8:
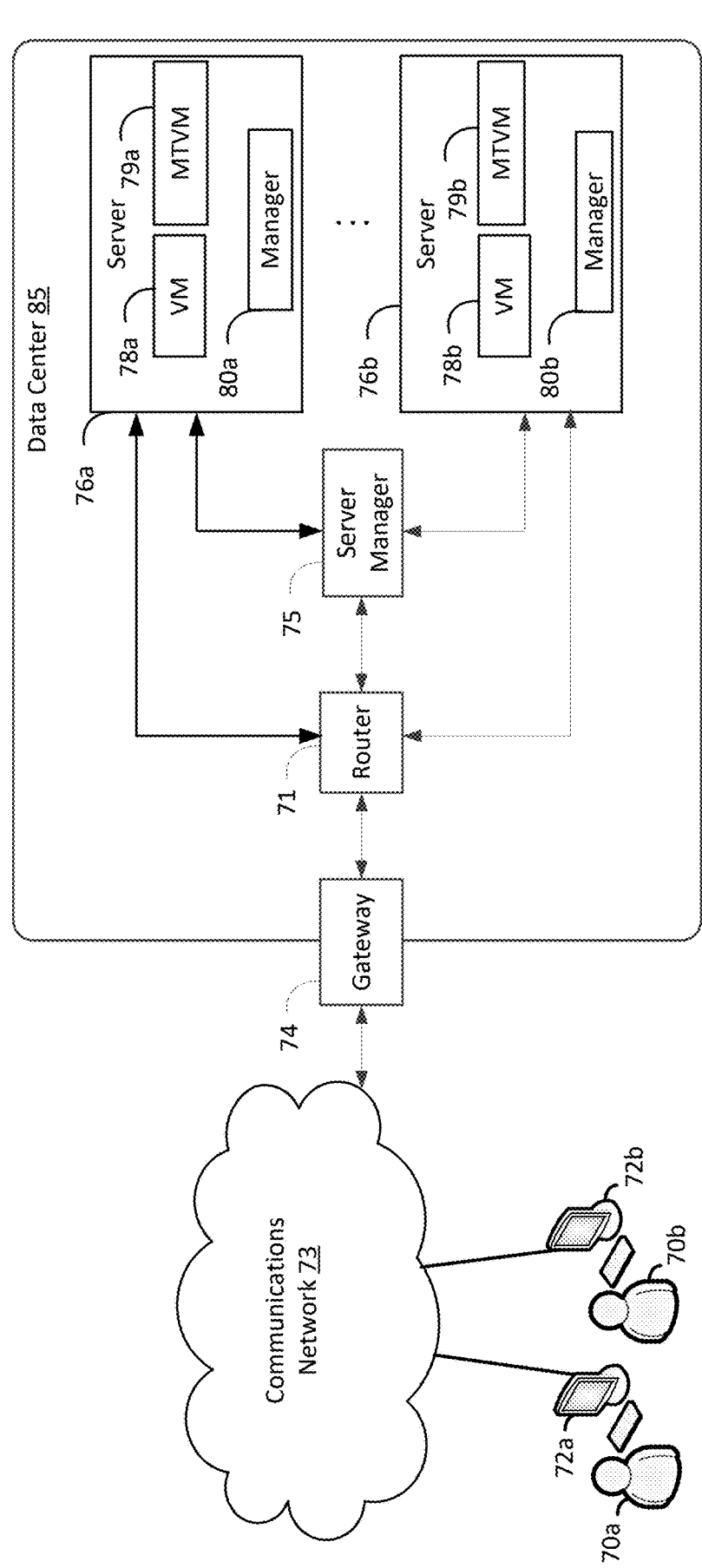
FIG. 8 is a diagram illustrating an example system for transmitting and providing data that may be used in accordance with the present description.

An example system for transmitting and providing data will now be described in detail. In particular, FIG. 8 illustrates an example computing environment in which the embodiments described herein may be implemented. FIG. 8 is a diagram schematically illustrating an example of a data center 85 that can provide computing resources to users 70*a* and 70*b* (which may be referred herein singularly as user 70 or in the plural as users 70) via user computers 72*a* and 72*b* (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76*a* and 76*b* (which may be referred herein singularly as server 76 or in the plural as servers 76) that provide computing resources. These resources may be available as bare metal resources or as virtual machine instances 78*a-b* (which may be referred herein singularly as virtual machine instance 78 or in the plural as virtual machine instances 78). In this example, the resources also include model testing virtual machines (DDCVM's) 79*a-b*, which are virtual machines that are configured to execute any, or all, of the neural network model evolution testing techniques and other techniques described above.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 8, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72*a* or 72*b* may be a server, a desktop or laptop personal computer, a tablet computer, a wireless telephone, a personal digital assistant (PDA), an e-book reader, a game console, a set-top box or any other computing device capable of accessing data center 85. User computer 72*a* or 72*b* may connect directly to the Internet (e.g., via a cable modem or a Digital Subscriber Line (DSL)). Although only two user computers 72*a* and 72*b* are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 8 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80*a* or 80*b* (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 8, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 8, a server manager 75 is also employed to at least in part direct various communications to, from and/or between servers 76a and 76b. While FIG. 8 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 8 has been greatly simplified and that many more networks and networking devices may be utilized to interconnect the various computing systems disclosed herein. These network topologies and devices should be apparent to those skilled in the art.

It should also be appreciated that data center 85 described in FIG. 8 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 9:
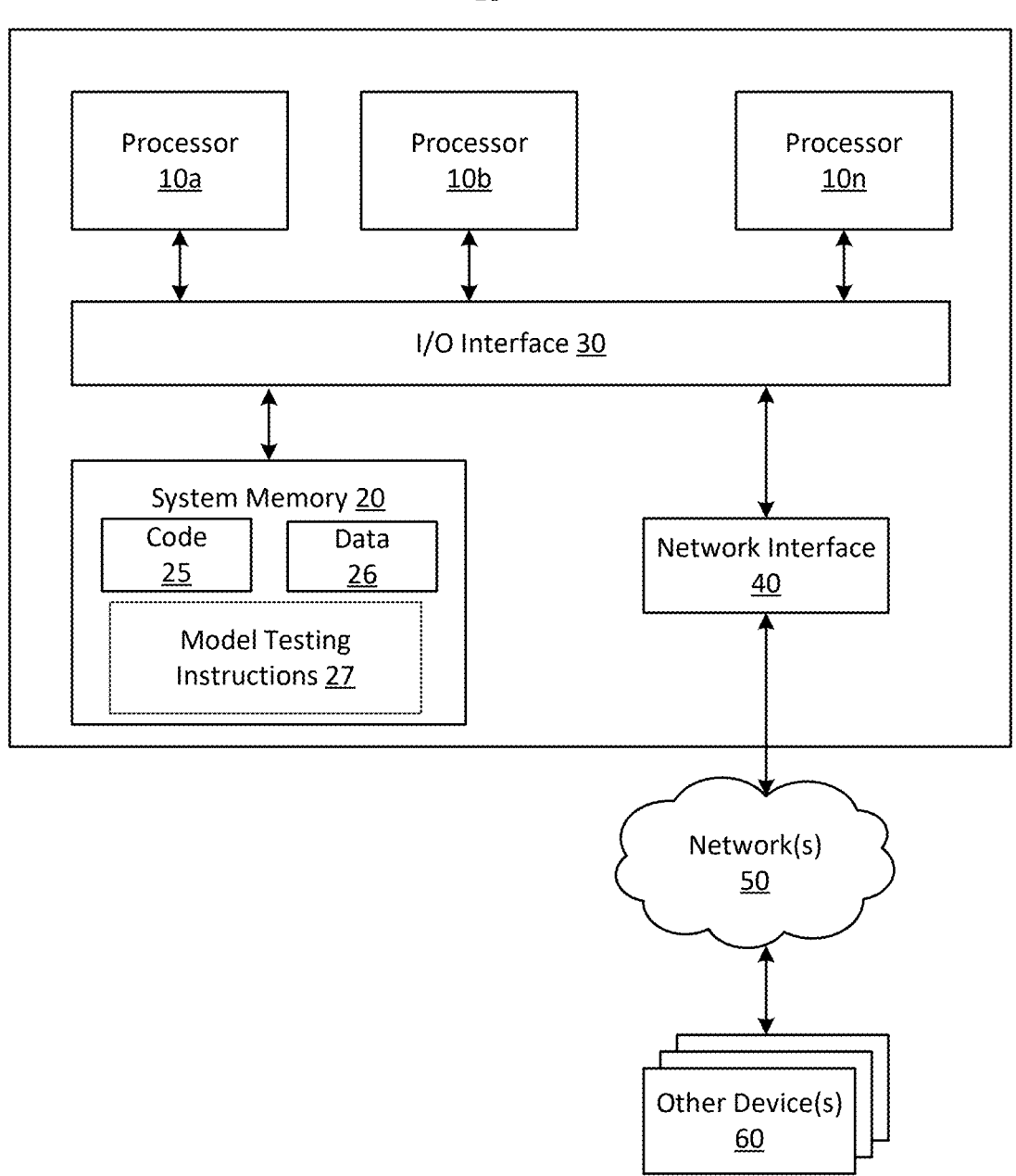
FIG. 9 is a diagram illustrating an example computing system that may be used in accordance with the present description.

In at least some embodiments, a server that implements a portion or all of one or more of the technologies described herein may include a computer system that includes or is configured to access one or more computer-accessible media. FIG. 9 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash©-type memory or any other type of memory. In the illustrated embodiment, program instructions and data implementing one or more desired functions, such as those methods, techniques and data described above, are shown stored within system memory 20 as code 25 and data 26. Additionally, in this example, system memory 20 includes model testing instructions 27, which are instructions for executing any, or all, of the neural network model evolution testing techniques and other techniques described above.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability container of a resource instance is intended to be independent of the availability container of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:

one or more processors; and one or more memories having stored therein instructions that, upon execution by the one or more processors, cause the computing system to perform computing operations comprising:

comparing a plurality of result pairs of at least part of an input region of neural network model input data, each of the plurality of result pairs including a first result provided by a first neural network model for a respective subregion of the input region and a second result provided by a second neural network model for the respective subregion of the input region, wherein the second neural network model is an update of the first neural network model, and wherein the second neural network model is trained subsequent to training of the first neural network model;

determining that there exists a non-equivalent result pair within the plurality of result pairs, wherein the first result of the non-equivalent result pair provided by the first neural network model differs from the second result of the non-equivalent result pair provided by the second neural network model;

retraining, based at least in part on existence of the non-equivalent result pair, the second neural network model;

repeating the comparing, the determining, and the retraining until there are no non-equivalent result pairs within the input region; and indicating, based on an absence of the non-equivalent result pairs within the input region, that the second neural network model is ready to deploy.

2. The computing system of claim 1, wherein the retraining is performed using a retraining dataset that includes synthetic data corresponding to the non-equivalent result pair.

3. The computing system of claim 1, wherein the operations further comprise:

determining that the non-equivalent result pair corresponds to a valid use case, wherein the retraining is based in part on the non-equivalent result pair corresponding to the valid use case.

4. The computing system of claim 3, wherein other non-equivalent result pairs that do not correspond to valid use cases trigger refining of the input region for the comparing.

5. A computer-implemented method comprising:

comparing a plurality of result pairs of at least part of an input region of neural network model input data, each of the plurality of result pairs including a first result provided by a first neural network model for a respective subregion of the input region and a second result provided by a second neural network model for the respective subregion of the input region;

determining that there exists a non-equivalent result pair within the plurality of result pairs, wherein the first result of the non-equivalent result pair provided by the first neural network model differs from the second result of the non-equivalent result pair provided by the second neural network model;

retraining, based at least in part on existence of the non-equivalent result pair, the second neural network model;

repeating the comparing, the determining, and the retraining until there are no non-equivalent result pairs within the input region; and indicating, based on an absence of the non-equivalent result pairs within the input region, that the second neural network model is ready to deploy.

6. The computer-implemented method of claim 5, wherein the determining that there exists the non-equivalent result pair within the plurality of result pairs comprises:

determining a non-equivalent parent region within the input region that includes at least one non-equivalent result pair; and iteratively partitioning the non-equivalent parent region into descendant regions until a threshold partition size is reached.

7. The computer-implemented method of claim 6, wherein each of the descendant regions that is a non-equivalent region is partitioned into two or more other of the descendant regions until the threshold partition size is reached.

8. The computer-implemented method of claim 5, wherein the retraining is performed using a retraining dataset that includes synthetic data corresponding to the non-equivalent result pair.

9. The computer-implemented method of claim 5, further comprising:

determining that the non-equivalent result pair corresponds to a valid use case, wherein the retraining is based in part on the non-equivalent result pair corresponding to the valid use case.

10. The computer-implemented method of claim 9, wherein other non-equivalent result pairs that do not correspond to valid use cases trigger refining of the input region for the comparing.

11. The computer-implemented method of claim 5, wherein the first neural network model and the second neural network model provide recommendations related to removal of security permissions.

12. The computer-implemented method of claim 5, wherein the first neural network model is trained using a first training dataset, wherein the second neural network model is trained using a second training dataset, and wherein the second training dataset is at least partially different from the first training dataset.

13. The computer-implemented method of claim 5, wherein the second neural network model is an update of the first neural network model.

14. One or more non-transitory computer-readable storage media having stored thereon computing instructions that, upon execution by one or more computing devices, cause the one or more computing devices to perform computing operations comprising:

comparing a plurality of result pairs of at least part of an input region of neural network model input data, each of the plurality of result pairs including a first result provided by a first neural network model for a respective subregion of the input region and a second result provided by a second neural network model for the respective subregion of the input region;

determining that there exists a non-equivalent result pair within the plurality of result pairs, wherein the first result of the non-equivalent result pair provided by the first neural network model differs from the second result of the non-equivalent result pair provided by the second neural network model;

retraining, based at least in part on existence of the non-equivalent result pair, the second neural network model;

repeating the comparing, the determining, and the retraining until there are no non-equivalent result pairs within the input region; and indicating, based on an absence of the non-equivalent result pairs within the input region, that the second neural network model is ready to deploy.

15. The one or more non-transitory computer-readable storage media of claim 14, wherein the determining that there exists the non-equivalent result pair within the plurality of result pairs comprises:

determining a non-equivalent parent region within the input region that includes at least one non-equivalent result pair; and iteratively partitioning the non-equivalent parent region into descendant regions until a threshold partition size is reached.

16. The one or more non-transitory computer-readable storage media of claim 15, wherein each of the descendant regions that is a non-equivalent region is partitioned into two or more other of the descendant regions until the threshold partition size is reached.

17. The one or more non-transitory computer-readable storage media of claim 14, wherein the retraining is performed using a retraining dataset that includes synthetic data corresponding to the non-equivalent result pair.

18. The one or more non-transitory computer-readable storage media of claim 14, wherein the operations further comprise:

determining that the non-equivalent result pair corresponds to a valid use case, wherein the retraining is based in part on the non-equivalent result pair corresponding to the valid use case.

19. The one or more non-transitory computer-readable storage media of claim 18, wherein other non-equivalent result pairs that do not correspond to valid use cases trigger refining of the input region for the comparing.

20. The one or more non-transitory computer-readable storage media of claim 14, wherein the second neural network model is an update of the first neural network model.

* * * * *